United States Patent [19]

Nielsen

[11] 4,287,243
[45] Sep. 1, 1981

[54] MAT FOR MULTISPECTRAL CAMOUFLAGE OF OBJECTS AND PERMANENT CONSTRUCTIONS

[75] Inventor: Willi G. Nielsen, Monrovia, Liberia

[73] Assignee: Gottlieb Commercial Company A/S, Krusaa, Denmark

[21] Appl. No.: 60,470

[22] Filed: Jul. 25, 1979

[30] Foreign Application Priority Data

Jul. 28, 1978 [DK] Denmark ............................ 3374/78

[51] Int. Cl.³ .............................................. F41H 3/00
[52] U.S. Cl. .................................. 428/17; 343/18 A; 428/919
[58] Field of Search ................ 428/17, 919; 343/18 A

[56] References Cited

U.S. PATENT DOCUMENTS

| | | | |
|---|---|---|---|
| 2,023,307 | 12/1935 | Burton | 428/17 X |
| 2,875,435 | 2/1959 | McMillan | 428/496 X |
| 3,157,557 | 11/1964 | Palmer | 428/17 |
| 3,160,549 | 12/1964 | Caldwell et al. | 428/352 X |
| 3,187,331 | 6/1965 | Beller | 428/919 X |
| 3,332,828 | 7/1967 | Faria et al. | 428/17 |
| 3,528,874 | 9/1970 | Spencer | 428/89 |
| 3,673,056 | 6/1972 | Nadler | 428/17 |
| 3,708,810 | 1/1973 | Merikallio | 428/919 X |
| 3,731,449 | 5/1973 | Kephart, Jr. | 428/256 X |
| 3,733,606 | 5/1973 | Johansson | 428/919 X |
| 3,837,980 | 9/1974 | Nishimura et al. | 428/17 |
| 3,978,533 | 9/1976 | Warner | 135/5 R X |

FOREIGN PATENT DOCUMENTS

| | | | |
|---|---|---|---|
| 2016404 | 1/1977 | Fed. Rep. of Germany | |
| 552514 | 4/1943 | United Kingdom | 428/919 X |
| 1404121 | 8/1975 | United Kingdom | 428/919 X |

Primary Examiner—Henry F. Epstein
Attorney, Agent, or Firm—Stevens, Davis, Miller & Mosher

[57] ABSTRACT

This invention discloses a mat for multispectral camouflage of objects and permanent constructions. The mat comprises a layer which is heat insulating and preferably also heat reflecting, especially a perforated layer. Materials such as carbon and metal are embedded into or coated upon the layer, said materials affecting the reflection and emission characteristics of the mat in the thermal infrared range and in the radar range. In order to obtain an overall protection against unwanted detection, also of plane and smooth surfaces, by means of a hard wearing camouflage mat said heat insulating and heat reflecting layer has on its side facing away from the object or permanent construction a diffusely reflecting layer, preferably a layer which is permeable to liquids.

6 Claims, 2 Drawing Figures

MAT FOR MULTISPECTRAL CAMOUFLAGE OF OBJECTS AND PERMANENT CONSTRUCTIONS

BACKGROUND OF THE INVENTION

The present invention relates to a mat for multispectral camouflage of objects and permanent constructions.

The development within the observation and target finding techniques makes it still more necessary to generate camouflage means which have a multispectral effect and which, consequently, are effective in the visual, the near infrared and the thermal spectral ranges as well as in the microwave range, or which at least in some of these ranges cause a reduction of the contrasts which artificial surfaces provide relative to natural environments as far as visual appearance, heat radiation, reflection of light and radar waves etc. are concerned. For plane, inclined or horizontal surfaces, e.g. on buildings or material or on roads or other fortified areas, it especially applies that in the visible spectral range irrespective of the colour they reflect incident light in such a way that they appear very bright relative to natural surroundings. Moreover, some of said surfaces are frequently trafficked, often by vehicles, which raises particular requirements to the camouflage means.

Known are camouflage means such as camouflage nets or camouflage mats which are effective in one or more spectral ranges, cf. e.g. the published German Specifications DE-OS 20 16 404 and DE-OS 22 52 431. Said specifications deal with camouflage mats, which by means of combinations of heat insulating layers and metal foils and possibly textile coatings provide protection against observation and target finding apparatus in the visual, the infrared and thermal ranges as well as in the radarrange. However, especially owing to the foils provided in said known camouflage mats, these known mats have to be treated with considerable care, and they cannot bear traffic, especially traffic by vehicles, and furthermore they are not suitable to camouflage plane surfaces owing to the particular reflection characteristics of such surfaces visual spectral range as mentioned in the above.

SUMMARY OF THE INVENTION

It is an object of the present invention to provide a robust and hard-wearing camouflage mat having a multispectral effect and providing an effective overall protection against detection, also of plane and smooth reflecting surfaces.

In a mat for multispectral camouflage of objects and permanent constructions, said mat comprising at least one heat insulating and heat reflecting layer, especially a perforated layer, which is provided with at least one material, e.g. carbon or metal, influencing the reflection and emission characteristics of the mat in the thermal infrared range and in the radar range, the heat insulating layer having on the side facing away from the object or permanent construction a diffuse reflecting layer, preferably a layer which is permeable to liquids.

Owing to the diffusely reflecting layer, the camouflage mat according to the invention provides an effective camouflage also of plane horizontal or inclined surfaces, because said layer is able to melt completely into the environments, e.g. grass, and furthermore it is owing to the diffuse reflection not possible to observe any difference between the camouflage mat and natural environments caused by different reflection of light in the visual range, such as it is the case with known camouflage mats having plane and relatively smooth surfaces, the structure of which differs strongly from the structure of natural environments causing considerable contrasts owing to reflection differences.

Since the materials affecting the radar reflection characteristics of the camouflage mat of the present invention, which materials may be carbon particles to camouflage by reduction of the radar wave reflection or metal webs for producing a decoy effect by increasing the radar wave reflection, provide an effective protection and a misleading deception effect, respectively, in the microwave range and the heat insulating and/or heat reflecting layer camouflages against heat-radiation sensitive IR (infrared radiation)-sensors, the supplementary camouflage in the visual spectral range, which is obtained by the diffusely reflecting layer, results in a substantially total protection against unwanted detection, said protection being—and this is extremely important—obtained by a strong and robust camouflage mat, which need not comprise metal foils being exposed to mechanical damages and which, therefore, bears heavy handling, e.g. by a fast laying out, and which also bears traffic by vehicles so that the camouflage may be permanent.

BRIEF DESCRIPTION OF THE DRAWINGS

The invention will in the following be further explained with reference to the drawing.

DETAILED DESCRIPTION

Figure 1:
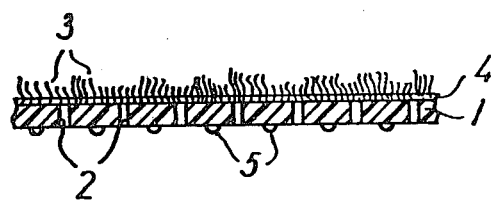
FIG. 1 shows a first embodiment of a camouflage mat according to the invention.

The camouflage mat shown comprises a heat insulating layer 1 having at 2 perforations, so that liquid such as water may penetrate through the layer. The layer 1 may, for example, be made of a synthetic latex compound or a plastic material such as polyvinylchloride. On the side of the mat, which in use turns away from the camouflaged object or plant, the heat insulating layer 1 has a diffusely reflecting layer, which in the shown example is constituted by hard twisted synthetic fibres 3 having varying lengths which may in practice amount to 2-4 centimeters. These fibres, which for example may be made from synthetic materials such as polypropylene, polyethylene, polyamide or polyester, may in a manner not shown be moulded into the heat insulating material with one of their ends or they may be woven as a pile in a liquid permeable web 4, e.g. made from plastic filaments, said web 4 being fastened to the surface of the heat insulating material 1, e.g. by glueing. It is expedient that the fibres 3 are moulded or woven into the heat insulating material 1 or the web 4, respectively, in such a manner that shorter fibres support longer fibres, and that the fibres are placed and coloured (pigmented) in such a way that colour, luminance, brightness and integral reflection as well as near infrared reflection correspond to those of the natural environments, in which the camouflage mat is intended to be used, e.g. grass-grown areas, which may take place in a manner known per se.

The heat insulating layer 1 is preferably made of rubber or foamed plastic such as polyurethane foam which may without difficulties be adapted to the intended use with regard to thickness and pore volume and thus heat insulating property, so that the desired attenuation of heat radiation from an object or a permanent construction camouflaged by the camouflage mat and thus the desired reduction or elimination of the possibilities of detection thereof by means of IR-sensors is obtained.

In order to also reduce or eliminate the possibilities of detection by means of radar equipment, the heat insulating material of the layer 1 may contain materials attenuating or preventing the reflection of radar waves such as carbon particles or fibres absorbing radar waves, e.g. fibres from metal such as ferrites. Said materials may be embedded into the heat insulating material of layer 1. There may also—possibly locally—be provided, e.g. by embedding, metal particles or metal webs, e.g. of copper, increasing the reflection of radar waves and thus producing a misleading effect for observers and sensors. Metal webs and radar wave absorbing fibres or carbon may also be provided on the surface of the layer 1, e.g. between the layer 1 and the diffusely reflecting layer 3, 4 without the mechanical strength of the camouflage mat being reduced appreciably. A misleading effect may also be produced in the infrared range, e.g. by embedding locally in a manner known per se heating elements, for example resistance wires, into the heat insulating material of layer 1.

On the underside of the camouflage mat there may be provided spacers, e.g. spacing ribs 5 from the same material as that of the heat insulating layer 1, said spacers bearing during the use of the camouflage mat against the camouflaged object or permanent construction. Thereby, a certain distance is ensured between said object or construction and the camouflage mat, so that the heat insulation is increased and liquid such as rain water which penetrates through the camouflage mat from the outside thereof may be drained off.

Figure 2:
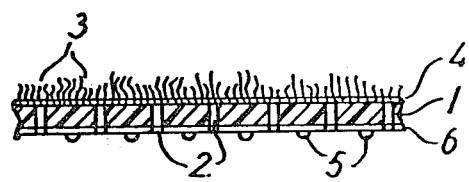
FIG. 2 shows a further development of the embodiment shown in FIG. 1.

The camouflage mat shown in FIG. 2 differs from the mat in FIG. 1 in that on the underside of the heat insulating layer 1 there is provided one or more foils 6, which are preferably perforated, said foils serving to reflect heat emitted or radiated from the camouflaged object or plant. This embodiment is particularly expedient when camouflaging surfaces of high temperatures. For the mechanical protection of such foils 6, there may on the sides thereof facing the camouflaged object or plant be provided a protection layer of a thermal transparent material, such as a thermal transparent plastic material.

The embodiment of FIG. 2 is owing to the reflection layer 6 not quite as robust as the embodiment of FIG. 1, and it cannot bear traffic to the same extent, but the camouflage mat of FIG. 2 is as mentioned in the above intended for camouflage of objects having a particularly high temperature, such as guns, generators, engines etc., such objects not bearing traffic.

I claim:

1. A multispectral camouflage mat for camouflaging objects and permanent constructions comprising at least one heat insulating and heat reflecting layer containing at least one radar characteristic influencing material, said layer influencing the reflection and emission characteristics of said mat in the thermal infrared range and in the radar range, said layer having on its side which faces away from a camouflaged object or construction a visual diffusely reflecting layer comprising a material permeable to liquids which carries a fiber pile, the fibers of said pile having free ends projecting from said heat insulating layer.

2. A multispectral camouflage mat as in claim 1 wherein the projecting free ends of said fibers are of non-uniform lengths.

3. A multispectral camouflage mat as in claim 2 wherein said layer is perforated, said material is one of carbon or metal and said fibers are hard twisted synthetic fibers.

4. A multispectral camouflage mat as in claim 1, 2 or 3 wherein said fibers are positioned and colored such that the integral reflection of the mat in the visual range corresponds to that of a natural environment.

5. A multispectral camouflage mat as in claim 4 wherein said natural environment is a grass area.

6. A multispectral comouflage mat as in claim 1 further comprising spacer ribs provided on the side of said mat which faces a camouflaged object or construction for bearing against said object or construction.

* * * * *